UNITED STATES PATENT OFFICE.

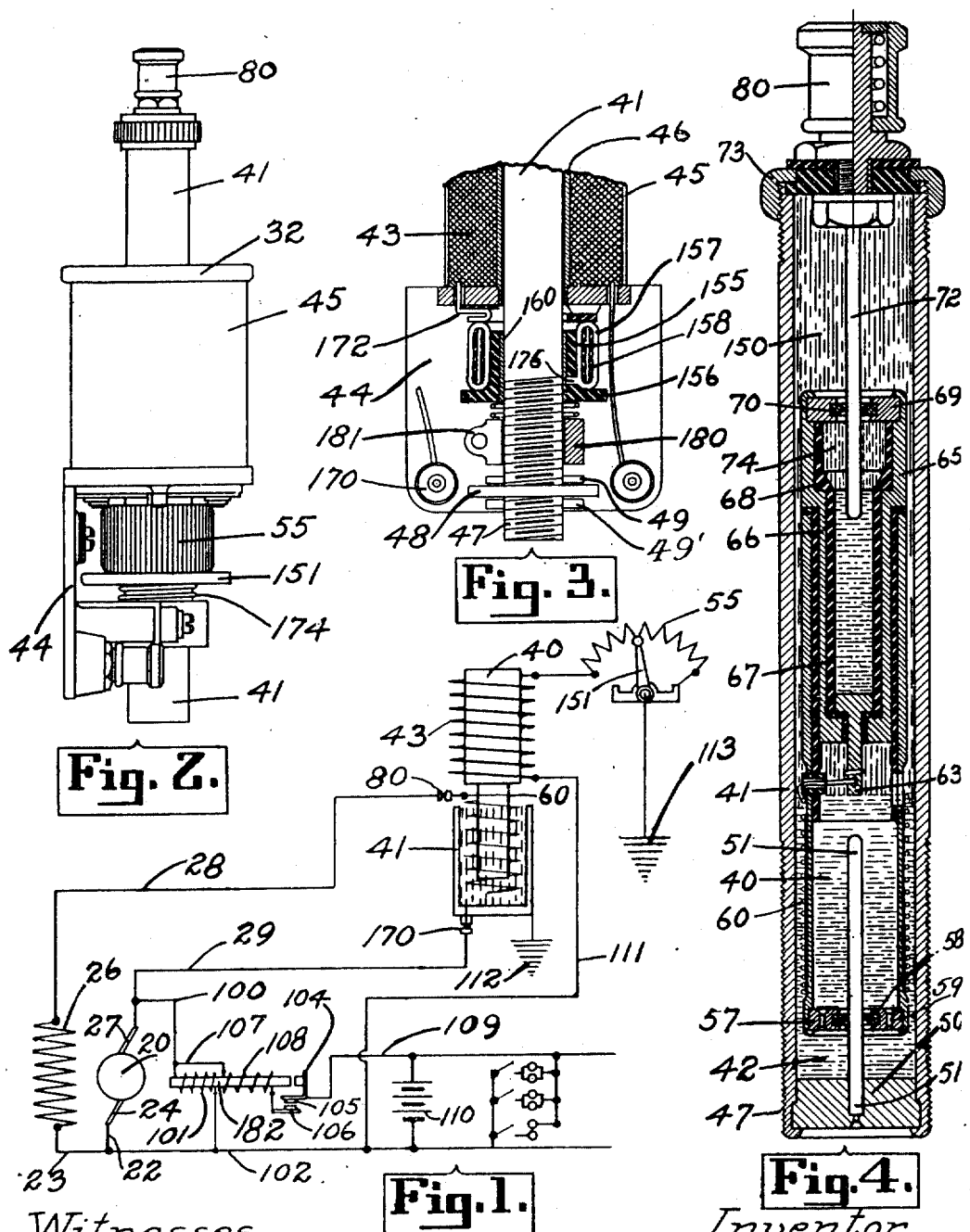

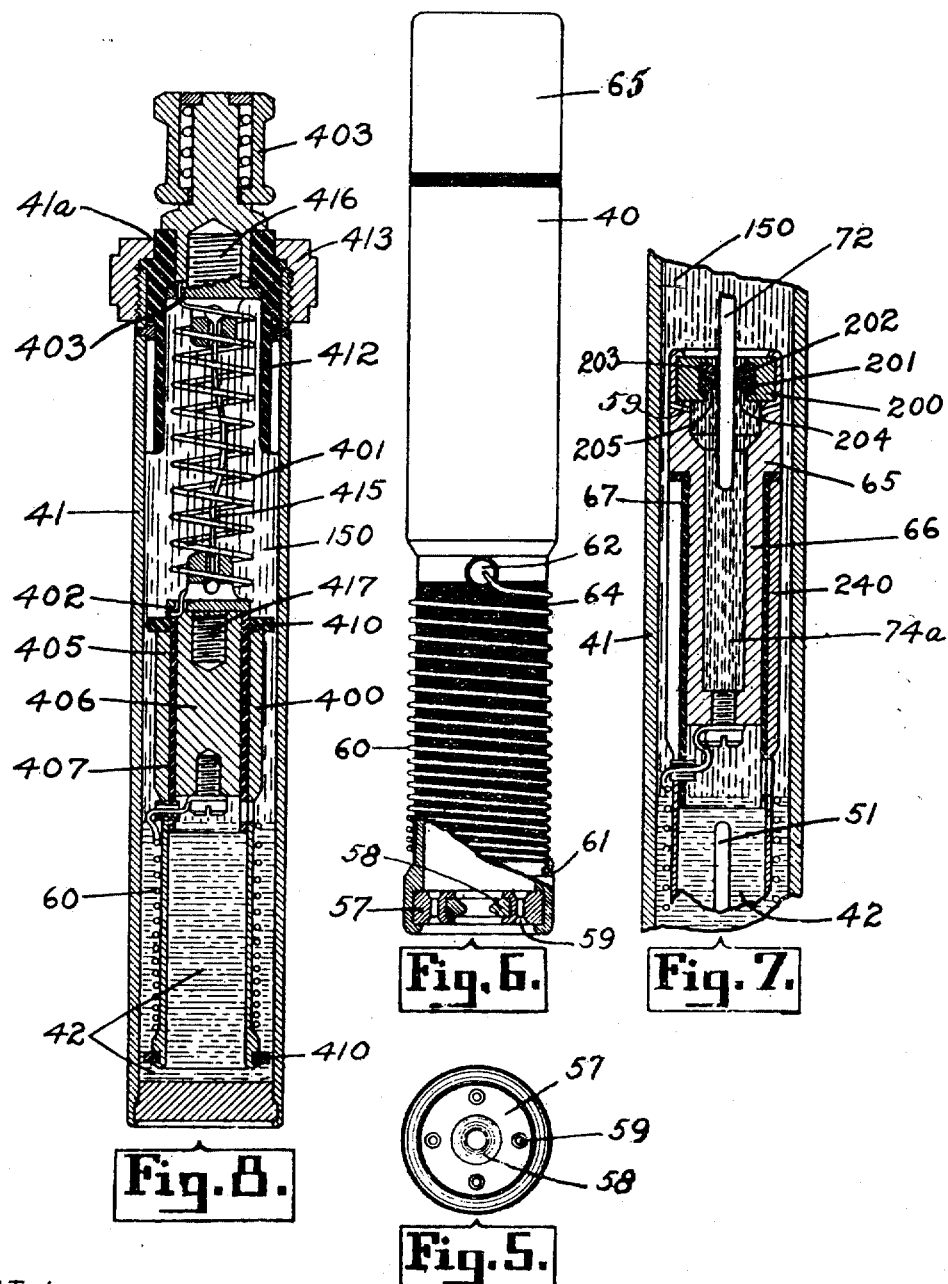

CHARLES F. KETTERING, OF DAYTON, OHIO, ASSIGNOR TO THE DAYTON ENGINEERING LABORATORIES CO., A CORPORATION OF OHIO.

CONTROL FOR ELECTRICAL SYSTEMS.

1,233,370.  Specification of Letters Patent.  Patented July 17, 1917.

Application filed November 11, 1912. Serial No. 730,733.

*To all whom it may concern:*

Be it known that I, CHARLES F. KETTERING, a citizen of the United States, residing at Dayton, county of Montgomery, and State of Ohio, have invented certain new and useful Improvements in Controls for Electrical Systems, of which the following is a full, clear, and exact description.

This invention relates to an improvement in regulators for electrical systems and more particularly to regulators of that type which are adapted to control certain electrical conditions, by varying the resistance in relation thereto.

The present invention is particularly adapted for electrical systems, wherein an electrical machine is employed for supplying current, either directly to work circuits or to an accumulator, from which current may be drawn, for any suitable purpose.

One of the objects of the present invention is to provide means of regulation, which, when combined with a system embodying a current generator, employed for furnishing power directly to work circuits, will maintain the voltage of the out-put of the machine, and also the voltage of the work circuits, substantially constant.

In certain instances it may be desirable to have the means of regulation controlled by certain functions of the electric machine which is to be controlled.

More specifically, in one of the preferred embodiments of the present invention which is disclosed in the present application, simply for the purposes of illustration, the voltage of the electric machine tends to control certain instrumentalities which in turn will act upon the electric machine itself, and tend to prevent the voltage across the terminals of the machine from increasing above a certain determined maximum, regardless of the speed of the machine.

Again, when the regulator is combined with systems, wherein a current generator and an accumulator are in combination, the effect of the machine, relative to the regulator, will, under certain circumstances, effect the control of the voltage of its output, through the action of the regulator, while under other circumstances, the condition of the accumulator will so affect the regulator that the electric machine will be maintained in proper condition.

Another object of the present invention is to provide a regulator having a movable element, buoyantly supported within a container, but having no permanent or positive connection therewith, which is automatically actuated to vary the resistance, relative to a given electrical condition or circuit.

Another object of the present invention is to provide a regulator, having a movable element, so combined with its associated parts and control mechanism, that the frictional resistance thereof, in its movement from one position to another, will be reduced to a minimum.

Further objects and advantages of the present invention will be clearly apparent from the following description, reference being had to the accompanying drawings, wherein preferred forms of the present invention are clearly illustrated.

Figure 1 is a diagrammatic view, showing one electrical system of generation and distribution, wherein a regulator of the present type may be employed to great advantage.

Figs. 2 and 3 are views in side and front elevation of one of the preferred forms of the regulator and its associated mechanical parts, embodied in the present invention; portions of Fig. 3 being shown in section for the sake of clearness.

Fig. 4 is a vertical sectional view of the regulator or container tube and its associated parts.

Figs. 5 and 6 are detail views of the movable or plunger element of the regulator.

Figs. 7 and 8 are sectional views of modified forms of the regulator tube and its associated parts.

Referring to the drawings, it will be observed that the diagrammatic view in Fig. 1, discloses a system, wherein a dynamo or generator of the shunt wound type, is combined with a suitable accumulator or storage battery and work circuit.

It will, of course, be understood that the showing in the present case, is simply intended as an illustration of one system, wherein the present invention may be employed to advantage, but it is not to be considered in any sense as a limitation of the invention.

In the diagrammatic view, the dynamo-electric-machine is designated by the numeral 20, and has a shunt circuit, comprising the wires 22 and 23, connected with the brush 24 and one side of the field winding 26, the opposite side of said field winding being connected to the opposite brush 27, by means of the wires 28 and 29.

This shunt circuit includes certain of the elements of the regulator, which are automatically controlled to vary the strength of the shunt field excitation, and thus vary the voltage of the out-put of the generator.

In order to reduce the number of circuit wires, and various connections, when combining the regulator with a system of the present type, there are provided certain ground connections, which greatly facilitate the assembling of the system.

The regulator itself, embodies, broadly, a movable element or plunger 40, buoyantly mounted within a suitable casing or tube 41, and partly submerged within a body of conductive material 42, the density of which, and the weight of the movable element, being so proportioned that the degree of normal submersion of the movable element, may be accurately controlled.

While the normal position of the movable element is controlled as stated above, the operation thereof is controlled automatically, by means of a magnetic condition set up, through the medium of the coil 43, which, as will appear hereinafter, is connected directly across the main circuit.

The relation of the voltage coil to the movable or plunger element 40, is important, inasmuch as the movement of the plunger, in response to the effect of the magnetic circuit which is created by the flow of current through the voltage coil, will be controlled initially by the distance to which the plunger normally extends into the interior of the said coil. This, of course, may be accurately regulated by the position of the regulator tube or casing, relative to the voltage coil, inasmuch as the movable element has a given normal position, within said regulator tube.

A bracket element 44 is therefore provided, for supporting the voltage coil and also to adjustably support the container tube, relative thereto.

The voltage coil 43 is preferably contained in a casing 45, which is made of magnetic material and is provided with a cap or cover 32, having an opening registering with the opening through the center of the coil. In order that the coil and casing may be maintained in correct position and also to facilitate the assembling of the coil and its associated parts, the bracket element is provided with an upwardly extending tube 46, preferably of non-magnetic material, which fits snugly within the opening formed in the center of the coil. By connecting this extension to the bracket, the assembling of the regulator tube, as well as the voltage coil, is facilitated.

It will be seen from the above that the regulator tube 41 and the voltage coil 43, as well as its covering 45, are independently maintained and supported by the bracket 44, so that the plunger 40, carried by the tube, may be normally so positioned, relative to the coil, that a predetermined voltage of current passing therethrough, will be effective to draw the plunger element upward into the coil, out of the conductive material, a predetermined degree, much in the same manner as the action of a solenoid.

Of course, it will be obvious that by locating the plunger element in various positions, relative to the voltage coil, different voltages may be initially effective, to cause the withdrawal of the plunger element, a sufficient degree to cut in enough resistance to reduce the field excitation, to secure different desired conditions of the out-put of the generator.

One manner of securing this result will be apparent by referring to Fig. 3, wherein it will be seen that the lower portion of the regulator tube is threaded as at 47, to cooperate with the adjusting nut 48, which is permanently but rotatably held, relative to the regulator, between the projections 49 and 49', formed on the supporting bracket. By making this regulator tube adjustable, through the operation of the nut 48, extremely fine and accurate adjustments of the regulator casing and consequently, of the movable plunger, relative to the voltage coil, may be made from time to time, to either vary conditions, as desired, or to readjust the regulator to meet some new requirements.

The regulator casing 41 is preferably of tubular construction and must be of such material that it will be impervious to the attack of any of the qualities of the conductive material, which is preferably mercury or quick silver.

One end of the tube or casing is inclosed by means of the plug or insert 50, which has a guide 51, projecting therefrom into the interior of the regulator casing and substantially concentric thereto.

The plunger element 40, is supported within the regulator casing, simply by the buoyancy thereof, relative to the body of conductive material. Because of this fact, that portion of the plunger which lies within the voltage coil should have a sufficient degree of permeability, so that the effectiveness of the magnetic circuit will, at a predetermined critical voltage passing through the coil, begin to withdraw the plunger from the conductive material.

Now, as soon as the plunger is drawn into the coil, the strength of the magnetic circuit is increased and this effect compensates for the apparent increase in the weight of the plunger as it is withdrawn from the conductive material. This apparent increase in the weight of the plunger is due to the decrease in the buoyant effect as the plunger is withdrawn from its normal position.

The normal degree of submersion of the plunger is carefully proportioned by the weight thereof, relative to the density of the body of material in which it is floated.

As will be seen from an inspection of Fig. 4, the lower portion of the plunger is of tubular conformation, and carries on its outer surface, a high resistance winding 60, which is so applied that the space between the successive turns of the winding, varies. Thus, it will be seen that upon a given initial movement of the plunger, a certain number of turns of the resistance wire will be withdrawn from the conductive material, and cut into the circuit to be controlled, while for a further increment of movement, a different number of turns of resistance will be cut into or out of the controlled circuit.

One of the characteristics of an electric machine of the type shown in the present instance, is that as the speed increases, and the machine reaches a fairly high speed, a greater amount of resistance must be cut in for the increased speed than when the machine is operating at fairly low speeds. The present invention meets this condition by varying the distance between the successive turns of the resistance unit on the plunger, so that at comparatively low speeds, a relatively small number of turns of resistance will be cut into the field of the generator for a given movement of the regulator plunger, while for an equal increment of movement of the plunger, after the machine has rotated at comparatively high speeds, a greater number of turns of the resistance will be cut in, thus introducing a greater amount of resistance in the field circuit.

The lower end of the plunger element is provided with a disk 57, having a suitable bearing or opening 58, which is of such size as to permit the passage of the upwardly extending guide 51 therethrough.

A series of openings or perforations 59 are formed in the body of the disk 57, so that the conductive material within which a portion of the plunger element is submerged, may readily pass therethrough, into the interior of the plunger. This structure provides a damping effect on the movement of the plunger, thus preventing any tendency of fluctuation or movement of the plunger element, other than that effected by the magnetic circuit.

One of the important features of the present invention is to provide a regulator, wherein the movement of the plunger element, will, substantially, be the only element which will have effect to cut in or out resistance, to vary any given electrical condition. That is, in the present invention, the displacement of the conductive material is made effective only to a slight degree, relative to the resistance, by the movement of the plunger element.

This result is secured by making the lower portion of the regulator plunger of tubular conformation, so that that portion which is normally submerged within the conductive material, consists of a relatively thin shell. As has heretofore been described, the shell portion of the plunger has series of turns of high resistance winding 60, mentioned heretofore, so applied that the lower end thereof can be connected to the lower extremity of the plunger, in any suitable manner, as at 61, while the upper terminal thereof can be readily passed through an insulated opening 62, formed in the side of the plunger and secured to the downwardly projecting end of the conductive plug 63.

A thin layer of insulation 64, preferably mica, is interposed between the high resistance winding and the body of the plunger element, the function of which will appear as the description progresses.

The upper part of the plunger element, which comprises the head portion 65, is provided with the reduced shank 66, which has a press fit within the insulating sleeve 67.

The head portion 65 is hollow and is lined with insulation, as at 68, thus forming an insulated chamber 74. The upper end of this chamber has a disk 69, carrying the bearing 70, while the enlarged head of the plug 63, which, as has been described, is connected with the resistance winding 60, forms a bottom of conductive material for said chamber.

The bearing at the upper end of this chamber is of substantially the same construction as that provided at the lower end of the plunger, through which the guide element 51 passes. A needle or pin 72, similar to the element 51, is secured to the cover 73 of the regulator tube and projects downwardly through the bearing 70, into the chamber 74. These guiding elements are accurately alined and are adapted to prevent undue lateral movement of the plunger 40.

The function of the needle or pin 72 is not only to coöperate with the guide 51, to maintain the alinement of the plunger, throughout its movement, but also to form a part of the circuit to be controlled. This is arranged by inclosing a quantity of conductive material within the chamber 74, which will be of such volume that it will at all times be in contact with the pin 72.

Thus, the current passing through the main body of conductive material 42 must also pass through a short portion of the resistance winding which connects with the pin 63, in order to reach the conductive material contained in the chamber 74.

As will appear hereinafter, any variation in the weight of the plunger element may be compensated for by the operation or adjustment of the rheostat 55; but it will also be seen that by varying the quantity of mercury placed within the chamber 74, practically the same result will be obtained, that is, the varying of the weight of the plunger.

This is an extremely important feature, inasmuch as it permits the degree of submersion of the plunger within the main conductive body 42, to be accurately maintained.

However, the volume of mercury contained within said chamber, should, at least, be of such height that the conducting needle 72 may project through the bearing in the head of the plunger and contact therewith, without necessarily being of such an extended length as to prevent the plunger from being operated sufficiently to cut in substantially all of the high resistance winding.

That is, there must be sufficient space for the plunger to be withdrawn from the main body of conductive material to cut in practically all of the resistance winding carried by the plunger, previous to the impingement of the conductive needle 72, on the plug 63, which forms the bottom of the plunger chamber. As a matter of fact, the amount of resistance carried by the plunger element may be so arranged that it is necessary to cut in only a portion of the total winding, to meet normal conditions, while the remainder of the resistance would simply be brought into use to meet abnormal circumstances.

Among the above named elements of the regulator are certain of those which have been described heretofore, as being included within the shunt circuit of the generator, that is, it will be understood that the wire 29 is connected with the terminal 170, which has electrical connection with the regulator casing 41, in such a manner that the current will normally pass from the said terminal, through the bracket 44 to the tube 41, thence through the main body of conductive material 42, into the body of conductive material carried by the plunger, via any of the resistance windings which may be uncovered, and plug 63, needle 72, through the terminal 80 into the wire 28, and thence through the field winding 26, substantially short-circuiting the resistance 60, carried by the plunger element.

Initially it will be seen that the field circuit will be substantially free from resistance, at least there will only be a small amount cut in.

Now, as the speed of the generator increases, the current value through the main circuit will tend to increase and therefore the voltage across the line will also increase.

The voltage coil 43 is connected directly across the main circuit, the current passing directly from the wire 29, through the terminal connection 170 to the grounded connections 112 and 113, thence through the rheostat handle 151, and if this is in position to cut out the entire rheostat winding 55, the current will flow directly through the winding 43, wire 111, to wire 102, which is connected with the brush 24 of the generator. The wire 29 is of course connected with the brush 27, so that it will be seen that the coil 43 is directly across the generator brushes.

Under certain conditions, it will be necessary to move the rheostat 151 over the resistance 55, in order to increase or decrease the voltage through the coil 43, so as to either increase or decrease the magnetic pull on the plunger 40.

This flow of current will tend to create a magnetic field, but it will be obvious in the present instance, that this field must not be built up sufficiently to attract the plunger element to cut resistance into the shunt field, until after the cut-out relay device 182 has been closed. This cut-out relay 182 is adapted to prevent the back flow of current from the storage battery to the generator, at such times as the generator is in inoperative position, or to prevent such a flow of current at such times as the battery voltage may be greater than the voltage of the out-put of the generator.

This is an important feature of the present invention, inasmuch as if the regulator is brought into operation, to cut resistance into the shunt field, and thus maintain the shunt field at a voltage below that which closes the cut-out relay, it will be impossible to close the cut-out relay, which will, of course, prevent the proper charging of the battery. Therefore, it is necessary that the cut-out relay be so proportioned as to its windings and mechanical construction, that it will close at a lower voltage than that necessary to bring the resistance into effect, relative to the field.

The functions of the regulator, relative to the main circuit and the accumulator, will be better understood from the following description: Supposing that the generator is to be operated to charge the battery, which it will be supposed is in discharged condition. The initial action of the generator is to pass current through the shunt circuit heretofore described, that is, from the brush 27, through wire 29, terminal 170, through the main body of conductive material 42, contained in the regulator plug, the body of conductive material carried by the plunger, the conductive needle 72, into the wire 28, through the shunt field, back to the opposite brush of the generator 24.

At the same time, a small amount of current is passing from the brush 27, through the wire 100, to the fine winding 101 of the relay 182, across to the opposite side 102 of the main circuit, back to the generator.

Now, as soon as the voltage of current passing through the fine winding of the cut-out relay, increases sufficiently to actuate the armature 104, to close the main circuit through the contacts 105 and 106, the current will begin flowing through the wire 107, heavy winding 108, contacts 105 and 106, to one side of the battery 110, via the wire 109, through the battery and back to the generator, via the wires 102 and 22, and the brush 24.

However, the voltage of the out-put of the generator should be controlled with relation to the normal voltage of the battery, so in the present instance, the voltage coil 43 of the regulator, is connected directly across the main circuit, by means of the wires 111 and 29, and ground connections 112 and 113; thus the coil will be subjected to the voltage of the generator, if that be the controlling voltage, or to the voltage of the battery, at such times as the battery is fully charged and its voltage tends to increase beyond normal.

To illustrate the above, suppose that the generator is to be employed to supply current to work circuits, and suppose further, that the voltage of the work circuit or translating devices included therein, is six volts, the regulator must be so adjusted that when the voltage through the coil 43 increases above a predetermined maximum such as six volts, the regulator plunger will be withdrawn from the body of conductive material in which it is normally submerged, to cut in sufficient resistance into the shunt field to reduce the excitation thereof, and thus reduce the voltage of the out-put of the generator, to a certain predetermined point, as for instance, to six volts and to maintain the same at this point, regardless of increases which may occur in the generator speed.

However, if the battery is also included in the main circuit, and is cut in, as is shown in diagrammatic Fig. 1, between the generator and the work circuit, as soon as the battery is fully charged, the back E. M. F. will tend to decrease the charging current so that injurious overcharge of the battery will be prevented.

It has been found that where a body of conductive material, such as mercury, is raised and lowered intermittently, to different degrees, there is a tendency for the material, if it is a liquid, to split up, so that small particles thereof will tend to adhere to the interior of the vessel within which it is contained, and it has been found that especially in instruments of the type set forth herein, the splitting up of the material and the adherence thereof, to the sides of the regulator tube, or casing, may effect the efficiency and accuracy of the regulator.

There is also a tendency of the mercury, when the regulator receives sudden shocks or jars, to splash, which might render the instrument inefficient. This is especially true of instruments of the present type, which must be so constructed and arranged that they can be employed with equal facility, upon stationary or portable electrical systems.

For instance, if an instrument of this type is employed in an electrical system carried on a vehicle, it will be subjected to a practically continuous series of shocks and vibrations.

It has been found that the above objection may be practically eliminated by placing a suitable oil in the casing 41 over the body of conductive material, this imparting a damping effect on the body of conductive material and preventing injurious fluctuations thereof, due to vibrations or shocks.

This oil, which is designated by the numeral 150, will also lubricate the interior of the regulator casing and the plunger 40, so that the mercury will be prevented from adhering to the sides of the plunger and casing.

It will, of course, be obvious that a portion of the body of oil will enter the chamber 74 and thus provide a simple damping and lubricating effect on the conductive material contained therein.

It has been found that care must be exercised in the selection and preparation of the damping and lubricating oil, inasmuch as it must be of such properties that it will not attack either the tube 41, the plunger element 40, or the body of conductive material, or in fact, any of the parts which may be brought into contact therewith.

In manufacturing the plunger element 40, in large quantities, it is practically impossible to secure uniform weight and dimensions thereof. It is, however, extremely advisable that the loss or excess in the weight of the plunger or in the dimensions thereof, be compensated for in some manner, so that some uniform and standard requirement, as to the amount of resistance to be cut in for a given voltage passing through the controlling coil 43, may be readily met, without attempting to vary the quantity or density of the conductive material, and without necessitating further changes in the plunger element to bring the same to uniform weight and dimensions.

In Figs. 2 and 3, there is shown a small manually operated rheostat 55, the windings of which, providing the operating handle 151 is in one of its extreme positions, will be directly in series with the windings of the voltage coil 43. By adjusting this hand operated lever 151, any suitable amount of resistance may be cut into the voltage coil circuit, which will result in either increasing or decreasing the strength of the magnetic field created by the current passing through the voltage winding 43.

In assembling the various parts of the present invention, it is only necessary that the body of conductive material 42 be of such volume that it will normally cover the turns of resistance winding carried on the exterior of the plunger. As soon as any movement of the plunger takes place, through the effect of the magnetic field, a certain number of turns of the winding, in accordance with the degree of movement of the plunger, will be withdrawn from the conductive material and cut into the circuit to be controlled. As soon as the resistance is cut into this circuit, which in the present instance is shown as being the field circuit, the excitation thereof, will be reduced, whereby the voltage of the generator output will also be reduced. Thus, by adjusting the rheostat to regulate the voltage of current necessary to create a magnetic field of sufficient strength to properly operate the plunger, variations in the weight or dimensions of the plunger, may be readily compensated for.

Inasmuch as instruments of the present type are employed to accurately indicate, measure, or control very slight changes in the voltages of a given circuit, some means must be provided to compensate for temperature effects upon the elements of the regulator and it follows that in case a storage battery is combined with the present system, it is also desirable to compensate for the varying temperatures thereof, to secure suitable and uniform results.

It is a well known fact that the internal resistances of a battery increase when the temperature lowers, while the resistance of the voltage coil 43, will tend to decrease as the temperature lowers. The reverse of this action, of course, takes place when the temperature increases. The rheostat 55, which has been referred to heretofore, is designed to compensate for temperature changes which take place, either in the battery or voltage coil, or in fact, any temperature changes which may effect the regulator. These functions of the rheostat are in addition to those heretofore set forth.

The structure of the rheostat set forth in the present instance, is clearly shown in Figs. 2 and 3, and comprises an insulating sleeve 155, having a flange 156. The sleeve 155 carries a high resistance winding 157, which in turn has a core of insulating material 158. One terminal 176 of the high resistance winding 157 extends through the insulating sleeve 155 and has electrical connection with a metallic sleeve 160, which is in direct contact with the regulator tube 41. As has been described heretofore, this tube has electrical connection with the terminal post 170, to which the line wire 29 is connected.

This connection of the terminal 176 of the rheostat winding with the sleeve 160, is indicated in Fig. 1, by means of the ground connections 113 and 112. The connection between the rheostat winding and the voltage coil 43, is secured by means of the angular arm 172, which projects down through the supporting portion of the bracket 44, and has a frictional connection or engagement with certain turns of the resistance winding.

The entire rheostat heretofore described, is resiliently mounted intermediate the arms 180 and 181, and the voltage coil 43, by means of the spring 174. This spring arrangement always maintains some turn or turns of the winding in good contact with the arm 172, and at the same time, permits the movement of the sleeve 155, together with the winding 157, relative to the arm 172.

When the instrument is initially assembled and is installed in the electrical system, a predetermined standard of operation is required, that is, the plunger element must be so constructed and arranged relative to the voltage coil, and the voltage coil must be of such construction that current up to a predetermined voltage may be passed through the voltage coil, without creating a magnetic field of sufficient strength to raise the plunger element and thus cut in resistance into the circuit to be controlled.

However, as soon as the voltage of this current rises beyond a predetermined point, a magnetic field of sufficient strength to operate the plunger element, must be created, and the plunger element must be in such position, relative to the voltage coil that the plunger element will be actuated immediately, as has been described heretofore.

Variations in certain of the elements of the system, due either to temperature effects or to slight un-uniformity in the construction of the elements, may be compensated for by the operation of the sleeve 155, of the rheostat 55, so as to increase or decrease the critical voltage which will cause the initial operation of the plunger element.

In Fig. 7, there is illustrated a modified form of the plunger element, wherein the body of conductive material, carried in the chamber 74 of the plunger element embodied in Fig. 4, is eliminated.

In this form of the plunger, the structure is practically the same, with the exception that there is no necessity, as will appear hereinafter, for lining the chamber 74 with insulating material.

In the present instance, a head element 130

200, which comprises a ring, is mounted at the upper extremity of the plunger, in any suitable manner. The interior face of this ring or head element 200, is adapted to receive and carry two smaller rings 201 and 202, which have their co-adjacent faces oppositely beveled, as at 203, to provide the chamber 204.

These ring elements 201 and 202 are designed to form a line bearing for the guide element 72, and in order to reduce the amount of frictional resistance between the portions of the elements 201 and 202, with the needle 72, the outer faces of these elements are beveled as at 205. This result, that is, the reduction of frictional resistance between these elements, is further effected by constructing the elements 201 and 202 of substantially non-abrasive material, which however must be of good electrical conductivity.

It will be seen that the chamber 204 has a central opening, through which the needle 72 passes, and it is therefore necessary that the material contained within said chamber, and which should comprise material of good conductivity, should have sufficient surface tension to prevent leakage of the same, when the plunger element 240 is moved from one position to another.

One material which has been found to answer the requirements for use under the above conditions, is mercury, but it is to be understood that the present invention is not to be limited to the use of mercury, but that any other material or mass having the required characteristics may be used instead.

However, in the present case, the chamber 74ª, will simply provide a space to receive the needle 72, at such times as the plunger element 240 is moved upwardly. The remaining structure of this modification is substantially the same and further detail description will therefore not be given.

Fig. 8 illustrates a type of regulator which is slightly different from those embodied in Figs. 4 and 7, and comprises an outer casing 41. Within this casing, a plunger element 400 is positioned, and is buoyantly supported by the body of conductive liquid 42. This plunger element, however, in this modified form, is so arranged when in assembled position, that it may be readily removed from the tube 41, by first removing the inclosure 41ª. In order to accomplish this, the plunger 400 is connected to the anchor bolt or plug 416, which forms a part of the inclosure 41ª; this anchor bolt or plug being electrically connected with the terminal post 403, which also forms a part of the inclosure or cover 41ª.

In the present modified form of the invention, the manner of effecting the electrical connection between the bolt or plug 416 and the terminal post 403, is by means of a helix 401. This helix, however, has no supporting function, relative to the plunger element, it simply constituting a means for conducting the current from the plunger element to the terminal post 403. The plunger element, itself, comprises the shell 405, having a solid head portion 406, separated from the shell 405, by means of the insulating sleeve 407.

This solid head portion is connected to one end of the resistance wire 60, and also to one end of the helix 401, as is clearly shown in Fig. 8.

In order to prevent objectionable lateral movement of the plunger element, a series of guiding elements 410, shown in the present illustration, as being of insulating material, are mounted at the opposite extremities of the plunger element and project outwardly into proximity with the interior of the casing 41.

An insulated guard 412 projects downwardly from the cover 413, and protects the upper portion of the helix 401 from inadvertent contact with the regulator casing 41.

As a means for dis-assembling or removing the plunger element from its position within the casing 41, a small flexible connection 415 is connected to the terminal post 403, through the means of the anchor nut or bolt 416, and to the upper extremity of the plunger element, by means of a similar anchor nut 417.

By having this flexible connection between the terminal post 403 and the plunger element 40, of such length that there is normally no strain thereon, it will be seen that the only effect that this connection will have is to facilitate the removal of the plunger from the casing.

It will, of course, be understood that a certain amount of oil is provided in the present form, for the same purposes described in connection with the forms shown in Figs. 4 and 7. The other details of construction are similar to those set forth in the description of the above mentioned figures.

While the form of mechanism herein shown and described constitutes a preferred form of embodiment of the invention, it is to be understood that other forms might be adopted, all coming within the scope of the claims which follow.

What I claim is as follows:

1. In the regulation of electrical systems, the combination with a controlling circuit and a circuit to be controlled; of a regulator comprising a casing having a body of conductive material therein; a resistance device connected with the circuit to be controlled but normally short-circuited by said conductive material; a movable element buoyantly supported in said conductive material and operable through the effect of the controlling circuit to cut said resistance into and out of the circuit to be controlled; and a depending guide element secured to said casing and adapted to pass into a chamber formed in the movable element, to maintain the movable element in alinement throughout its degree of movement and also to form a part of the circuit to be controlled.

2. In the regulation of electrical systems, the combination with a controlling circuit and a circuit to be controlled; of a regulator comprising a casing having a body of conductive material therein; a resistance device connected to the circuit to be controlled but normally short-circuited by the body of conductive material; a movable element buoyantly supported in said conductive material and operable through the effect of the controlling circuit, to cut said resistance device into and out of the circuit to be controlled, said movable element being provided with chambers in the opposite ends thereof; and guides connected to opposite ends of said casing, each of said guides adapted to extend into one of the chambers formed in said movable element, for maintaining the movable element in alinement throughout its degree of movement.

3. In the regulation of electrical systems, the combination with a controlling circuit and a circuit to be controlled; of a regulator comprising a casing having a body of conductive liquid contained therein and forming a part of the circuit to be controlled; a resistance unit normally short-circuited by the body of liquid contained in said casing, but operable to be withdrawn from said liquid and cut into the circuit to be controlled; and a movable element adapted to carry said resistance device, said movable element being buoyantly supported by the conductive material contained in said casing, and a variable body of conductive material carried by the movable element and also constituting a part of the circuit to be controlled; and a guide element connected to said casing and adapted to project into the body of conductive liquid carried by the movable element, whereby to complete the circuit to be controlled.

4. In the regulation of electrical systems, the combination with a controlling circuit and a circuit to be controlled; of a regulator comprising a casing having a body of conductive liquid contained therein; a resistance device adapted to be cut into and out of the circuit to be controlled, but normally being short-circuited in the body of conductive liquid contained in said casing; a movable element carrying said resistance device contained in said casing and buoyantly supported by said conductive liquid, said movable element being provided with a chamber in one end thereof; a variable body of conductive liquid carried in said chamber; and a conductive element included in the circuit to be controlled and adapted to depend into said chamber and to be constantly in contact with said conductive material, whereby the circuit to be controlled is completed.

5. In a regulator, the combination with a casing, a body of conductive material contained therein; a movable element contained in said casing and partly submerged in said conductive material; and a bearing of said substantially non-abrasive material carried thereby; and a guide connected to the casing and extending through said bearing to maintain the plunger in alinement throughout its degree of movement.

6. In a regulator, the combination with a casing, a body of conductive liquid contained therein; a movable element contained in said casing and partly submerged in said liquid, said element having chambers at its opposite ends; bearings positioned at the open ends of said chambers; and guide elements connected to said casing and extending through each of said bearings to maintain the alinement of the movable element, throughout its degree of movement.

7. In a regulator, the combination with a casing, a body of conductive liquid contained therein; a movable element contained in said casing and partly submerged in said liquid, said element having chambers at its opposite ends; bearings of substantially non-abrasive material positioned at the open ends of said chambers; and guide elements connected to said casing and extending through each of said bearings to maintain the alinement of the movable element, throughout its degree of movement.

8. In a regulator, the combination with a casing, and a body of conductive liquid contained therein; of a movable resistance carrying element contained in said casing and partly submerged in said liquid, said plunger element having a chamber open at one end; an insulated lining for said chamber; a body of conductive material carried in said chamber and electrically connected with the resistance carried by the movable element; and a conductive element constantly in contact with said conductive material.

9. In a regulator, the combination with a controlling coil and a regulator tube; of a bracket element independently supporting said controlling coil and tube, said tube having a threaded lower end and a nut construction maintained in a determined position by said bracket, coöperating therewith, whereby the regulator tube may be adjusted relative to the controlling coil.

10. In apparatus of the character described, the combination with a receptacle, of a liquid electrical conductor contained therein, a tubular resistor mounted to reciprocate in the receptacle in engagement with the liquid electrical conductor contained therein and having its lower end provided with a permanently uncovered restricted outlet opening of a substantially smaller diameter than the bore of the tubular resistor whereby the liquid electrical conductor may enter the interior of the tubular resistor and gradually discharge therefrom upon the upward movement of the tubular resistor, and electrically operated means to raise the tubular resistor.

11. In apparatus of the character described, a receptacle, a liquid electrical conductor contained therein, a substantially vertically movable tubular resistor disposed within the receptacle and provided near one end with an opening, and means to move the tubular resistor.

12. In apparatus of the character described, the combination with a receptacle, of a liquid electrical conductor contained therein, a tubular resistor having its lower end provided with a restricted outlet opening whereby the liquid electrical conductor contained therein will be gradually discharged from the interior thereof upon the upward movement of the tubular resistor, and means to raise and lower the tubular resistor.

In testimony whereof I affix my signature in the presence of two subscribing witnesses.

CHARLES F. KETTERING.

Witnesses:
JOSEPH W. McDONALD,
WALTER N. RIEDEL.

Copies of this patent may be obtained for five cents each, by addressing the "Commissioner of Patents, Washington, D. C."